United States Patent [19]

Maeda et al.

[11] Patent Number: 4,461,865

[45] Date of Patent: Jul. 24, 1984

[54] ABS RESIN COMPOSITION

[75] Inventors: Tetsuro Maeda; Yasuo Yoshii; Akihiro Okamoto; Isamu Nishinakagawa, all of Ichihara, Japan

[73] Assignee: Denki Kagaku Kogyo Kabushiki Kaisha, Tokyo, Japan

[21] Appl. No.: 407,893

[22] Filed: Aug. 13, 1982

[30] Foreign Application Priority Data

Aug. 31, 1981 [JP] Japan .................. 56-135507

[51] Int. Cl.$^3$ .............................................. C08K 3/08
[52] U.S. Cl. .................... 524/440; 523/205; 524/413; 524/441; 524/781; 524/786; 524/919; 428/403; 428/462
[58] Field of Search ............... 524/440, 441, 781, 786, 524/919, 413; 523/205; 428/403, 462

[56] References Cited

U.S. PATENT DOCUMENTS

| | | | |
|---|---|---|---|
| 2,986,547 | 5/1961 | Jefts et al. | 524/441 |
| 3,041,303 | 6/1962 | Nelson | 524/441 |
| 3,427,264 | 2/1969 | Forster et al. | 524/440 |
| 3,617,364 | 11/1971 | Jarema et al. | 428/462 |

FOREIGN PATENT DOCUMENTS

| | | | |
|---|---|---|---|
| 6082 | 5/1977 | Japan | 524/786 |
| 114534 | 9/1979 | Japan | 524/440 |
| 154440 | 12/1979 | Japan | |
| 120637 | 9/1980 | Japan | 524/440 |

OTHER PUBLICATIONS

Derwent, Abst. 77662e/37, J57126848, (8-82).
Derwent, Abst. 08437c/05, J54160466, (12-79).
Derwent, Abst. 04411c/03, J54154440, (12-79).
Derwent, Abst. 66917b/37, J54097674, (8-79).

*Primary Examiner*—Herbert J. Lilling
*Attorney, Agent, or Firm*—Oblon, Fisher, Spivak, McClelland & Maier

[57] ABSTRACT

An ABS resin composition comprises 100 parts by weight of an ABS resin having a melt index of at least 4.0 g/10 min. and a rubber content of from 10 to 28% by weight and from 0.5 to 30 parts by weight of powder of at least one metal selected from aluminum, copper and an copper alloy.

9 Claims, No Drawings

ABS RESIN COMPOSITION

BACKGROUND OF THE INVENTION

1. Field of the Invention

The present invention relates to a metal-containing ABS resin composition having superior impact and outer appearance.

2. Description of the Prior Art

As methods for imparting a metallic outer appearance to the surface of an ABS resin, various techniques are known such as metallic coating, hot stamping, wet plating and dry plating. However, these techniques are applicable only to formed resin products and involve complicated procedures.

If a metallic appearance is imparted to the resin itself, it is possible to obtain a formed resin product having a metallic outer appearance simply by a molding process without the after treatment of the formed resin as mentioned above, whereby the process for the production can be simplified. In this respect, various methods for incorporating metal powder in a resin have been proposed. For instance, there have been proposed a method in which at least 5% by weight of a metal powder is incorporated in an ABS resin to form pellets, which are then metallized with a metal and the like (Japanese Unexamined Patent Publication No. 97674/1979), and a method in which aluminum and copper or a copper alloy are added to a synthetic resin in an amount of from 1 to 80% by weight (Japanese Unexamined Patent Publication No. 114534/1979). However, formed ABS resin products having a metallic outer appearance obtained by these methods have drawbacks such that firstly, the formed resin product containing the metal powder presents a poor metallic texture on its surface and the color tone is rather dark, and secondly, when the resin is subjected to injection molding, the weld lines appearing on the surface of the formed product will be distinctly noticeable.

The weld lines are inevitably formed more or less during the injection molding of the ABS resin, and they are scar-like defects formed at positions where the molten resin flowing in the mold in separate streams along the passages of the mold gets together again to fuse. Namely, as the temperature of the front ends of the molten resin streams separated along the mold passages lowers, the mixing of the resin tends to be difficult when the separated resin streams get together to fuse, whereby defectively fused sectional surface appears on the surface of the molded product. Especially, the ABS resin containing a metal powder has a higher heat transmission rate than the ABS resin, and the temperature drop of the molten resin flowing in the mold is accordingly quicker, whereby the formation of the weld lines is more likely to occur.

SUMMARY OF THE INVENTION

It is an object of the present invention to overcome the above mentioned drawbacks and to provide an ABS resin composition having superior impact strength and capable of being molded into a formed ABS resin product having minimum weld lines and an improved metallic texture.

The present invention provides an ABS resin composition which comprises 100 parts by weight of an ABS resin having a melt index of at least 4.0 g/10 min. and a rubber content of from 10 to 28% by weight and from 0.5 to 30 parts by weight of powder of at least one metal selected from aluminum, copper and a copper alloy.

DETAILED DESCRIPTION OF THE PREFERRED EMBODIMENTS

The ABS resin used in the present invention has a melt index of at least 4.0 g/10 min. and a rubber content of from 10 to 28% by weight. More particularly, such a resin may be prepared by diluting from 14 to 70% by weight of an ABS resin having a melt index of not more than 1.0 g/10 min. and a rubber content of from 30 to 70% by weight with from 86 to 30% by weight of an AS resin having a melt index of at least 6.0 g/10 min.

In the present invention, the melt index is measured in accordance with the operation stipulated in JIS K-7210A under the conditions of the measuring temperature being 200° C. and the load of 5.00 kg with use of a testing apparatus stipulated in JIS K-7210, and represented by the weight of the resin flowed during a period of 10 minutes as recorded in a unit of g/10 min.

The ABS resin prior to the dilution should have a melt index of not more than 1.0 g/10 min., preferably not more than 0.1 g/10 min. If the melt index of the ABS resin exceeds 1.0 g/10 min., a balance of the required strength and flowability of the ABS resin after the dilution can not be maintained, whereby it is impossible to obtain a product, i.e. a metal-containing ABS resin, superior in the strength and in the outer appearance of the surface of the molded product.

Further, the ABS resin prior to the dilution should contain from 30 to 70% by weight of a rubber component. If the rubber component is less than 30% by weight, the amount of the AS resin to be added for dilution will be limited to be too small, whereby the balance of the various required properties can not be maintained. On the other hand, if the rubber component exceeds 70% by weight, the desired impact strength will not be obtained.

The AS resin used as a diluent should have a melt index of at least 6.0 g/10 min., preferably at least 7.5 g/10 min. If the melt index is less than 6.0 g/10 min., it will be required to reduce the rubber content of the ABS resin in order to bring the melt index of the diluted ABS resin to a desired level, such being undesirable.

When the ABS resin is mixed with the AS resin as a diluent, the amount of the ABS resin should be within a range of from 14 to 70% by weight. If the amount is not within this range, it will not be possible to maintain the balance of the flowability and the impact strength required for the metal-containing ABS resin.

The melt index of the diluted ABS resin is at least 4.0 g/10 min., preferably at least 5.0 g/10 min., more preferably at least 6.0 g/10 min. If the melt index is less than 4.0 g/10 min., the outer appearance of the surface of the formed product of the metal-containing ABS resin will be inferior. Further, the diluted ABS resin should have a rubber content of from 10 to 28% by weight. If the rubber content is less than 10% by weight, the impact strength will be inadequate. On the other hand, if the rubber content exceeds 28% by weight, the outer appearance of the surface of the formed product of the metal-containing ABS resin will be inferior.

As a technique to improve the melt index of the ABS resin or the AS resin, there have been proposed various methods, such as (1) to reduce the acrylonitrile content, (2) to lower the molecular weight, (3) to copolymerize with a monomer capable of improving the flowability and (4) to add a lublicant. In the present invention, the melt index may be improved by any one of such methods. In the above method (3), specific examples of the monomer capable of improving the flowability include monomers of acrylic acid esters or methacrylic acid esters such as methylacrylate, methylmethacrylate, ethylacrylate, butylacrylate, hexylacrylate, cyclohexylacrylate and 2-ethylhexylacrylate, and monomers of vinyl ethers such as methylvinyl ether, ethylvinyl ether, hexylvinyl ether and phenylvinyl ether. In many cases, the addition of a lubricant as mentioned in the method (4) is effective, and the amount of the lubricant to be added is usually from 0.1 to 10% by weight, preferably from 0.3 to 5% by weight, based on the diluted base ABS resin. If the amount is less than 0.1% by weight, no adequate effectiveness of the lubricant is obtainable, whereas if the amount exceeds 10% by weight, the tensile strength of the resin will be lowered. As specific examples of the lubricant to be added to the ABS resin, there may be mentioned higher fatty acids such as stearic acid, oleic acid, palmitic acid or linolic acid and their metal salts such as Ca, Mg, Zn, Ba and Pb salts, higher alcohols such as stearyl alcohol, oleic alcohol, lauryl alcohol, decyl alcohol, octyl alcohol and cetyl alcohol, higher fatty acid amides such as stearic acid amide, palmitic acid amide, methylenebisstearylamide and ethylenebisstearylamide, higher fatty acid esters such as ethylstearate, butylstearate, octylstearate, ethylene glycol monostearate, ethylene glycol distearate, stearic acid glyceride, sorbitan stearate, and sorbitol stearate, hydrocarbon compounds such as liquid paraffin, microwax, polyethylene wax and natural paraffin, and silicone oil. They may be used alone or in combination.

The method of the preparation of the ABS resin is not critical. Any one of the conventional emulsion polymerization, dispersion polymerization and bulk polymerization may be used. It is also possible to use them in proper combination.

The metal powder used in the present invention is one or more selected from aluminum, copper and a copper alloy. The amount of the metal powder to be incorporated into the ABS resin is not critical and should rather be determined depending upon the desired color tone for the formed product. As specific examples of the copper alloy powder, there may be mentioned Cu-Zn, Cu-Ni, Cu-Sn, Cu-Al, Cu-Ag and Cu-Pb.

The particle size of the metal powder is decisive to the outer appearance of the surface of the metal-containing ABS resin thereby obtainable. Accordingly, the particle size is selected depending upon the desired outer appearance of the formed product. Practically, however, a satisfactory outer appearance is obtainable when the metal powder has an average particle size of from 0.1 to 500 microns, preferably from 1 to 200 microns.

The metal powder may not necessarily be subjected to surface treatment. However, it is preferred to use the metal powder coated with e.g. a liquid substance, since it is thereby possible to minimize the operational problems such as explosion of the powdery dust or inhalation of the powdery dust. As the substance to be coated on the surface of the metal powder, any liquid substance may be used so long as it does not give an adverse influence over the resin, and in certain cases, solid powder having a good coating property may also be used. As specific examples, there may be mentioned higher fatty acids, higher fatty acid esters, higher fatty acid amides, liquid paraffins, silicone oil and phthalic acid esters.

The amount of the metal powder added to the ABS resin is from 0.5 to 30 parts by weight, preferably from 1 to 20 parts by weight based on 100 parts by weight of the resin. If the amount is less than 0.5 part by weight, no adequate effect of the addition of the metal powder will be obtainable, whereas if the amount exceeds 30 parts by weight, the impact strength of the metal-containing ABS resin will be substantially lowered, such being undesirable.

The manner of mixing the ABS resin with the metal powder is not critical, and the mixing can be done by a suitable conventional mixing method. For instance, there may be mentioned a method in which the ABS resin powder or its pellets and the metal powder are kneaded in a molten state, or a method in which the metal powder is added to a certain step in the process of the polymerization of the ABS resin. As the melt kneading apparatus, a Bumbury's mixer, an intensive mixer, a mixtruder, a cokneader, an extruder and rolls are mentioned. It is not always necessary first to prepare a metal-containing ABS resin with the metal powder uniformly dispersed in the ABS resin and then to subjecting it to the molding machine. Namely, it is possible to mix the metal powder and the ABS resin in e.g. a henschel mixer, whereby the mixture is directly molded.

Depending upon the particular use of the product, it may be necessary to add to the metal-containing ABS resin other additives such as a pigment, a dyestuff, a stabilizer, a dispersant, a reinforcing agent, a filler, a weather resistant agent, an antistatic agent, a fire resistant agent and a foaming agent.

When the ABS resin composition of the present invention thus obtained is subjected to molding operation by a molding machine, the flowing time of the molten resin in the mold is shortened and accordingly, even when the resin has a high heat transmission rate, the separate resin streams get together to fuse before the temperature of the resin drops to a fatal level, whereby the formation of the weld lines can be minimized. For the same reason, the temperature gradient of the molten resin streams in the cross sectional direction of the mold can be minimized and the metal powder composition in the cross sectional direction of the mold can be made relatively uniform, whereby the metal content in the vicinity of the contacting surface of the mold becomes high as compared with the conventional resin having a greater temperature gradient, and the metallic texture is thereby improved.

Further, when polymerization is employed as a method for improving the melt index of the ABS resin, the impact strength is usually decreased, and this tendency is pronounced when metal powder is incorporated, whereby the commercial value of the metal-containing ABS resin is likely to be substantially impaired. Whereas, the composition of the present invention is a mixture of the ABS resin having a specific melt index and the AS resin having a specific melt index, and the ABS resin having a rubber content of a specific range is used, whereby the impact strength can be maintained even though it has a high melt index.

The metal-containing ABS resin obtained by the present invention has high impact strength, a rich metallic texture and minimum noticeable weld lines, and is widely applicable as a substitute for metal or a metallized resin. It is extremely useful for e.g. ornaments.

Now, the present invention will be described in further detail with reference with Examples, in which the "parts" and "%" are all by weight.

EXAMPLE 1

Aluminum powder (average particle size: 10 microns) and brass powder (average particle size: 15 microns) were added respectively in the amounts shown in Table 1 to 100 parts of a resin having a melt index of 7.2 g/10 min. and obtained by mixing 38 parts of an ABS resin composed of 12.5% of acrylonitrile, 50% of butadiene and 37.5% of styrene and having a melt index of not more than 0.1 g/10 min., 62 parts of an AS resin composed of 24.5% of acrylonitrile and 75.5% of styrene and having a melt index of 9.4 g/10 min. and 2 parts of ethylenebisstearylamide, and the mixture was thoroughly mixed in a henschel mixer and then melt kneaded by an extruder to form pellets. The physical properties of the resin thus obtained were measured and the outer appearance of the formed product was observed. The results thereby obtained are shown in Table 1. Similar results were obtained when bronze was used instead of brass in Example 1.

EXAMPLE 2

An ABS resin and an AS resin shown in Table 2 were mixed in a proportion shown in Table 3. Then, 3 parts of aluminum powder (average particle size: 10 microns) was added to 100 parts of the resin mixture thus obtained, and pellets were obtained. The results of the evaluation of this resin are shown in Table 3.

COMPARATIVE EXAMPLE 1

An ABS resin and an AS resin shown in Table 2 were mixed in a proportion shown in Table 4. Then, 3 parts of aluminum powder (average particle size: 10 microns) was added to 100 parts of the resin mixture thus obtained, and pellets were prepared. The results obtained by measurement of the physical properties of this resin are shown in Table 4.

TABLE 1

| Experiment No. | 1 | 2 | 3 | 4 | 5 | 6 | 7 | 8 |
|---|---|---|---|---|---|---|---|---|
| Amount of aluminum (parts) | 2 | 5 | 10 | 15 | 20 | 0 | 0 | 5 |
| Amount of brass (parts) | 0 | 0 | 0 | 0 | 0 | 5 | 10 | 5 |
| Izod impact strength (Kgcm/cm) | 14 | 11 | 6.2 | 5.5 | 4.8 | 13 | 6.4 | 5.9 |
| Melt index (g/10 min.) | 7.0 | 6.7 | 6.0 | 5.6 | 5.1 | 7.1 | 6.2 | 6.1 |
| Metallic texture | B | A | A | A | B | A | B | A |
| Weld lines | A | A | B | B | C | B | B | B |

TABLE 2

| Resin No. | Acrylonitrile (%) | Butadiene (%) | Styrene (%) | n-Butyl-acrylate (%) | Melt index (g/10 min) |
|---|---|---|---|---|---|
| a | 7 | 60 | 28 | 5 | <0.1 |
| b | 12.5 | 50 | 37.5 | 0 | <0.1 |
| c | 15 | 40 | 45 | 0 | <0.1 |
| d | 11 | 50 | 35 | 4 | <0.1 |
| e | 19 | 20 | 61 | 0 | 0.8 |
| f | 6 | 80 | 14 | 0 | <0.1 |
| g | 14 | 35 | 51 | 0 | 1.2 |
| h | 24 | 0 | 76 | 0 | 12.5 |
| i | 24 | 0 | 76 | 0 | 7.9 |
| j | 24 | 0 | 76 | 0 | 4.6 |

TABLE 3

| Experiment No. | 9 | 10 | 11 | 12 | 13 | 14 | 15 | 16 |
|---|---|---|---|---|---|---|---|---|
| Base ABS resin | | | | | | | | |
| Non-diluted ABS resin (%) | a 33 | b 20 | b 25 | b 30 | b 40 | c 60 | d 40 | b 40 |
| AS resin (%) | h 65 | h 78 | h 73 | h 68 | h 58 | h 38 | i 58 | i 58 |
| Ethylenebis-stearylamide (%) | 2 | 2 | 2 | 2 | 2 | 2 | 2 | 2 |
| Diluted ABS resin Melt index (g/10 min) | 8.1 | 12.1 | 10.7 | 9.4 | 8.1 | 5.1 | 5.5 | 5.2 |
| Metal-containing ABS resin | | | | | | | | |
| Izod impact strength (Kgcm/cm) | 9.8 | 4.2 | 5.8 | 7.0 | 11 | 14 | 10 | 14 |
| Melt index (g/10 min) | 7.2 | 11.2 | 9.9 | 8.9 | 7.5 | 4.4 | 5.0 | 4.3 |
| Metallic texture | A | A | A | A | A | B | B | B |
| Weld lines | A | A | A | A | B | C | C | C |

TABLE 4

| Experiment No. | 17 | 18 | 19 | 20 | 21 | 22 | 23 |
|---|---|---|---|---|---|---|---|
| Base ABS resin | | | | | | | |
| Non-diluted ABS resin (%) | g 40 | g 80 | e 90 | f 25 | b 40 | b 10 | b 70 |
| AS resin (%) | h 58 | j 18 | h 8 | h 73 | j 58 | h 88 | h 28 |
| Ethylenebis-stearylamide (%) | 2 | 2 | 2 | 2 | 2 | 2 | 2 |
| Diluted ABS resin Melt index (g/10 min.) | 4.2 | 1.8 | 1.6 | 5.7 | 1.2 | 14.1 | 0.5 |
| Metal-containing ABS resin | | | | | | | |
| Izod impact strength (Kgcm/cm) | 1.9 | 14 | 13 | 1.9 | 17 | 1.4 | 24 |
| Melt index | 3.7 | 1.1 | 1.1 | 5.0 | 0.6 | 13.8 | <0.1 |

TABLE 4-continued

| Experiment No. | 17 | 18 | 19 | 20 | 21 | 22 | 23 |
|---|---|---|---|---|---|---|---|
| (g/10 min) | | | | | | | |
| Metallic texture | C | D | D | F | D | A | F |
| Weld lines | C | F | F | F | F | A | F |

In the foregoing Examples, the physical properties, etc. were measured in accordance with the following methods:

(1) Izod impact strength: JIS K-6871
(2) Melt index: JIS K-7210, temperature: 200° C., load: 5.00 kg.
(3) Metallic texture and weld lines A formed product was prepared by means of a 5 ounce injection molding machine with use of a mold in which dove gates are provided at positions 30 mm from both ends of a plate of 150×40×3.0 mm. The molding temperature and the mold temperature were set at 240° C. and 50° C., respectively, and the injection pressure was set at a level which is 5 kg/cm² higher than the minimum injection pressure. The metallic texture (gloss, brightness of the color, etc.) and the degree of the weld lines of the formed product thereby obtained were evaluated on the basis of the following five grades:

A: Extremely good,
B: Good,
C: Fair,
D: Inferior,
F: Extremely inferior.

We claim:

1. An ABS resin composition which comprises 100 parts by weight of an ABS resin having a melt index of at least 4.0 grams/10 min. and a butadiene content of from 10-24% by weight and from 0.5-30 parts by weight of powder of at least one metal selected from the group consisting of aluminum, copper and a copper alloy and wherein said ABS resin comprises 70-14% by weight of an ABS resin having a melt index of not more than 1.0 grams/10 min. and a butadiene content of from 30-70% by weight, and from 30-86% by weight of an AS resin having a melt index of at least 6.0 grams/10 min.

2. The ABS resin composition according to claim 1 wherein the amount of the metal powder is from 1 to 20 parts by weight relative to 100 parts by weight of the ABS resin.

3. The ABS resin composition according to claim 1 wherein the copper alloy is selected from Cu-Zn, Cu-Ni, Cu-Sn, Cu-Al, Cu-Ag and Cu-Pb alloys.

4. The ABS resin composition according to claim 1 wherein the metal powder has an average particle size of from 0.1 to 500 microns.

5. The ABS resin composition according to claim 1 wherein the metal powder has an average particle size of from 1 to 200 microns.

6. The ABS resin composition according to claim 1 wherein the ABS resin has a melt index of at least 5.0 g/10 min.

7. The ABS resin composition according to claim 1 wherein the ABS resin has a melt index of at least 6.0 g/10 min.

8. The ABS resin composition according to claim 1 wherein the melt index of the ABS resin is not more than 0.1 g/10 min. and the melt index of the AS resin is at least 7.5 g/10 min.

9. The ABS resin composition according to claim 1 which contains a lubricant in an amount of from 0.1 to 10% by weight based on the ABS resin.

* * * * *